(12) United States Patent
Sanders et al.

(10) Patent No.: US 10,138,980 B2
(45) Date of Patent: Nov. 27, 2018

(54) STACKED FLYWHEEL ROTOR

(71) Applicant: Amber Kinetics, Inc., Union City, CA (US)

(72) Inventors: Seth R. Sanders, Berkeley, CA (US); Eric Sun, Union City, CA (US); Mike M. He, San Jose, CA (US); Matthew K. Senesky, Berkeley, CA (US); Edward Young Chiao, San Jose, CA (US); Daniel Bakholdin, Newbury Park, CA (US)

(73) Assignee: Amber Kinetics, Inc., Union City, CA (US)

( * ) Notice: Subject to any disclaimer, the term of this patent is extended or adjusted under 35 U.S.C. 154(b) by 0 days.

(21) Appl. No.: 15/691,485

(22) Filed: Aug. 30, 2017

(65) Prior Publication Data

US 2018/0003263 A1 Jan. 4, 2018

Related U.S. Application Data

(63) Continuation-in-part of application No. 14/811,012, filed on Jul. 28, 2015, which is a continuation-in-part
(Continued)

(51) Int. Cl.
*F16F 15/30* (2006.01)
*F16F 15/315* (2006.01)
*H02K 7/02* (2006.01)

(52) U.S. Cl.
CPC .......... *F16F 15/3153* (2013.01); *F16F 15/30* (2013.01); *H02K 7/025* (2013.01); *Y02E 60/16* (2013.01)

(58) Field of Classification Search
CPC ...... F16F 15/30; F16F 15/315; F16F 15/3153; H02K 7/02; H02K 7/025; Y02E 60/16;
(Continued)

(56) References Cited

U.S. PATENT DOCUMENTS

| 923,633 A * | 6/1909 | Edison ................ F16D 1/033 403/336 |
| 3,436,572 A | 4/1969 | Storsand |

(Continued)

FOREIGN PATENT DOCUMENTS

| CN | 1247139 | 3/2000 |
| CN | 2389047 Y | 7/2000 |

(Continued)

OTHER PUBLICATIONS

Machine Translation of SU 649907, obtained Jul. 2, 2018.*
(Continued)

*Primary Examiner* — Adam D Rogers
*Assistant Examiner* — Brian J McGovern
(74) *Attorney, Agent, or Firm* — Fenwick & West LLP

(57) ABSTRACT

Embodiments of the subject invention are directed to a flywheel rotor that includes two or more sub-rotors stacked one on top of another, in which each sub-rotor is rotationally symmetric and disk shaped, where the axial centers of each sub-rotor in the stack are rotationally aligned, and each sub-rotor has an upper and a lower journal that extends outward from the origin of the center section of the primary rotational mass of the sub-rotor. Each pair of adjacent sub-rotors in the stack has a lower journal of an upper sub-rotor that is disposed above an upper journal of a lower sub-rotor. Also, there is a joining mechanism between each pair of adjacent sub-rotors that fixedly connects the lower journal of the upper sub-rotor to the upper journal of the lower sub-rotor.

10 Claims, 7 Drawing Sheets

Related U.S. Application Data of application No. 14/469,382, filed on Aug. 26, 2014, now Pat. No. 10,003,237.

(60) Provisional application No. 62/382,622, filed on Sep. 1, 2016.

(58) Field of Classification Search
CPC .. F16C 15/00; F16C 2361/55; Y10T 74/2117; Y10T 74/2119; Y10T 74/2121; B60K 6/10; F16B 17/004; F16D 1/076; F16D 1/033

See application file for complete search history.

(56) References Cited

U.S. PATENT DOCUMENTS

| | | | |
|---|---|---|---|
| 3,496,799 | A | 2/1970 | Call |
| 3,608,014 | A | 9/1971 | Balchan et al. |
| 3,752,216 | A | 8/1973 | Fritsche |
| 4,179,951 | A | 12/1979 | Theyse |
| 4,408,500 | A | 10/1983 | Kulkarni et al. |
| 4,688,419 | A | 8/1987 | D'Angelo et al. |
| 5,866,066 | A | 2/1999 | Hemphill et al. |
| 6,710,489 | B1 | 3/2004 | Gabrys |
| 6,825,588 | B2 | 11/2004 | Gabrys et al. |
| 8,112,862 | B2 * | 2/2012 | Chevrette ............... F16D 1/033 29/407.09 |
| 2004/0256929 | A1 | 12/2004 | Gabrys et al. |
| 2006/0048576 | A1 | 3/2006 | Kiuchi et al. |
| 2014/0103760 | A1 | 4/2014 | Dugas |
| 2015/0013148 | A1 | 1/2015 | Dharan |
| 2016/0061289 | A1 | 3/2016 | Sanders et al. |

FOREIGN PATENT DOCUMENTS

| | | | | |
|---|---|---|---|---|
| CN | 103671845 | A1 * | 3/2014 | ............ F16D 1/033 |
| DE | 251865 | C | 11/1912 | |
| DE | 2754623 | A1 | 6/1979 | |
| DE | 10343735 | A1 | 5/2004 | |
| EP | 2492528 | A1 | 8/2012 | |
| FR | 975009 | A | 2/1951 | |
| FR | 2486730 | A1 * | 1/1982 | .......... F16C 32/0468 |
| SU | 649907 | A1 * | 2/1979 | ............. F16F 15/30 |
| TW | 201400725 | A | 1/2014 | |
| WO | WO 02/03523 | A2 | 1/2002 | |
| WO | WO-2013131132 | A1 * | 9/2013 | ............ F16L 23/036 |
| WO | WO 2015/006136 | A2 | 1/2015 | |

OTHER PUBLICATIONS

Machine Translation of FR 2486730, obtained Jul. 3, 2018.*
Machine Translation of CN 103671845, obtained Jul. 6, 2018.*
PCT International Search Report for Written Opinion for PCT/US2017/049428, dated Nov. 20, 2017, 13 Pages.
Office Action for U.S. Appl. No. 14/811,012, dated Feb. 7, 2018, 10 pages.
First Office Action for Chinese Patent Application No. CN 201580045758.X, Apr. 24, 2018, 17 Pages.
Extended European Search Report for European Patent Application No. EP 15835832.5, dated Apr. 12, 2018, 14 Pages.
Office Action for Canadian Patent Application No. CA 2,958,926, dated Mar. 12, 2018, 5 Pages.
PCT International Search Report and Written Opinion for PCT/US15/45545, dated Nov. 23, 2015, 21 Pages.
Office Action from for ROC (Taiwan) Patent Application No. TW 104127724, dated Jun. 1, 2016, 12 Pages.
Office Action for U.S. Appl. No. 14/469,382, dated Nov. 23, 2016, 10 Pages.
Office Action for U.S. Appl. No. 14/469,382, dated Aug. 11, 2016, 14 Pages.
Office Action for U.S. Appl. No. 14/469,382, dated Jul. 13, 2017, 15 Pages.
Office Action for U.S. Appl. No. 14/811,012, dated May 1, 2017, 10 Pages.
Office Action for U.S. Appl. No. 14/811,012, dated Sep. 9, 2016, 8 Pages.
Office Action for U.S. Appl. No. 14/811,012, dated Mar. 11, 2016, 8 Pages.

* cited by examiner

STACKED FLYWHEEL ROTOR

CROSS REFERENCE TO RELATED APPLICATIONS

This application claims the benefit of priority to U.S. Provisional Application No. 62/382,622, filed on Sep. 1, 2016. This application is also a continuation-in-part of prior, co-pending U.S. application Ser. No. 14/811,012, filed on Jul. 28, 2015, which is a continuation-in-part of Ser. No. 14/469,382, filed on Aug. 26, 2014. All of the foregoing are incorporated by reference herein in their entirety for all purposes.

BACKGROUND

1. Field of Art

This description generally relates to energy storage, and particularly to energy storage using flywheels.

2. Description of the Related Art

Many energy sources, particularly clean energy sources such as wind turbines and solar panels, generate energy that does not temporally match the load experienced. In much of the developed world, energy generation follows experienced load, such that energy is provided as needed. Under circumstances of high load, techniques such as the use of peaker generators and spinning and non-spinning reserves on thermal generators allow for generation that matches high and variable load. However, despite the availability of such techniques, there are often instances where energy storage is important for meeting energy load.

Existing energy storage systems all have drawbacks of one form or another. Size, price, storage efficiency, efficacy, and safety are all concerns when designing an energy storage system. Generally, smaller size, lower price, reduced loss in both inputting energy for storage and extracting it for distribution, reduced losses for continuous operation, and safe disposal are all preferred characteristics of energy storage systems.

A flywheel is one type of energy storage system that stores energy as rotational kinetic energy. A flywheel rotor is a weighted, rotationally symmetric mass that spins while physically coupled, directly or indirectly, to a motor/alternator that itself is electrically coupled to a converter, such as a back-to-back inverter system, constituting an AC-AC conversion subsystem. When power is received for storage, the rotor is driven, increasing the rotational speed of the flywheel rotor. When power is to be extracted, the flywheel rotor drives the motor/alternator. The faster a flywheel rotor can spin, the more energy it can store, but the more stress is induced on the rotor. Generally, the amount of stress a rotor is able to sustain while operating is a function of the design, materials, and processes used to make the rotor. Specifically, the amount of stress that can be sustained depends on a combination of the rotor material's yield strength, fracture toughness, maximal intrinsic defect size, cyclic fatigue characteristics, and the rotor's shape, among other factors.

Generally, rotor thickness is constrained by the choice of materials from which it is manufactured. For example, rotor thickness when using low-alloy steel materials such as 300M steel is generally limited to 8-14 inches due to the constraint of through-hardening during the quench step. If using an alloy such as AISI 4340, thickness is further limited to about 4-6 inches.

In most applications, multiple flywheel units are required to meet the overall energy storage requirements. The overall system cost in such applications can be reduced by building larger flywheels units, i.e. individual units that store more kinetic energy by incorporating greater rotational, or rotor, mass. Since the thickness of a single rotor is constrained, other approaches may be used to increase flywheel rotor mass, and consequently increase the energy storage capacity of an individual flywheel unit. One way is to scale up diameter, while keeping thickness constrained. Scaling to large diameters is effective with respect to engineering design and generally known manufacturing techniques, but requires substantial capital investment in tooling to perform steps like forging and machining to final net shape. Shapes with large lateral dimensions can present logistical challenges in shipping.

SUMMARY

A high strength metal alloy flywheel rotor is described that offers improved kinetic energy storage at reduced cost. The flywheel rotor's performance is based in part on its material characteristics. In one embodiment, it has a yield strength of at least 800 MPa, a fracture toughness of at least 40 MPa·m$^{0.5}$, and a maximal intrinsic defect size of at most 2 millimeters (mm). These characteristics are consistent throughout its entirety.

In the same or a different embodiment, the rotor may be made of 300M vacuum-arc-remelting (VAR) steel that is through-hardened and tempered.

In various implementations, the rotor may also have additional characteristics beyond any of those described above. For example, the rotor may be formed with a diameter greater than its length (or thickness), or vice versa. The rotor may be rotationally symmetric. The rotor may be a monolithic shape without any bored holes. The rotor may include one or more journals protruding from the rotor allowing an external shaft to be physically attached to each journal. In one embodiment, the shaft may be attached using a shrink fit.

An exemplary method for manufacturing the rotor is also described.

A design that features multiple, interconnected, sub-rotors that together function as a single monolithic sub-rotor is disclosed. Generally, two or more sub-rotors are stacked on top of one another, each having the same axial center. Each pair of adjacent sub-rotors is attached using a joining mechanism. Here, the term sub-rotor merely refers to individual rotor sub-units. In one embodiment, each such rotor subunit may be manufactured according to any process or to any specification described herein. In another embodiment, each such rotor subunit may be manufactured by an alternative technique or to an alternate specification not specifically delineated in this application, including those not yet created at the time of this writing.

In one embodiment, the joining mechanism between pairs of sub-rotors is a tubular joining collar that is shrink fit around adjacent journals, which for convenience may be referred to as a lower journal of an upper sub-rotor and an upper journal of an upper sub-rotor. A alignment pin may be inserted through the axial center of the adjacent journals to maintain alignment.

In yet another embodiment, the joining mechanism between pairs of sub-rotors is a plate attached to the journal of an upper sub-rotor that is fastened to a plate attached to the journal of a lower sub-rotor. A alignment pin may be inserted through the axial center of the adjacent journals to maintain alignment.

BRIEF DESCRIPTION OF DRAWINGS

FIG. 3 also illustrates a shrink fit mounted stubshaft onto the journal.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

I. Flywheel Energy Storage System

Figure 1:
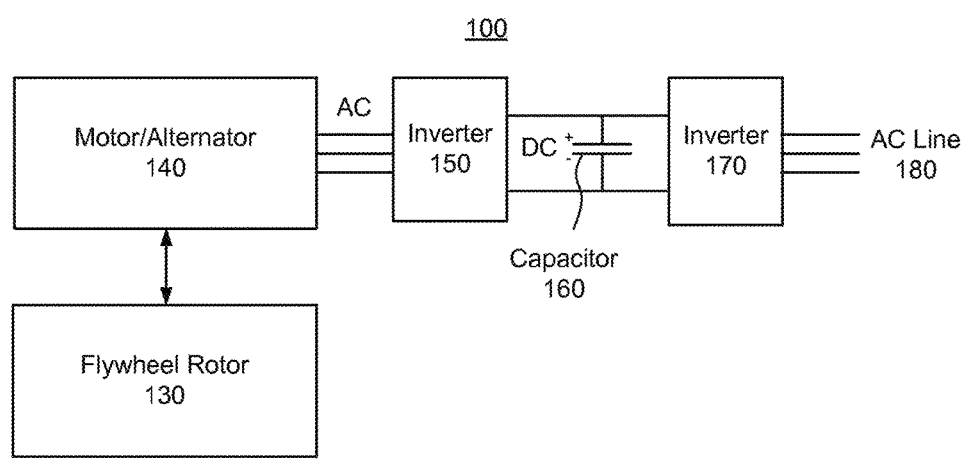
FIG. 1 is a block diagram of an exemplary flywheel energy storage system according to one embodiment.

FIG. 1 is a block diagram of an exemplary flywheel energy storage system 100 according to one embodiment. The energy storage system includes a flywheel rotor 130, a motor/alternator 140, a first inverter 150, a capacitor 160, a second inverter 170, and an AC line 180. Energy is drawn from, or delivered to, an AC line 180, such as a conventional three-phase 60 Hz line. The first 150 and second 170 inverters as well as capacitor 160 illustrate an exemplary back-to-back converter system for converting the input alternating current into an alternating current acceptable to the motor/alternator 140. The motor/alternator 140 converts between electrical and mechanical energy, so that energy can be stored in or drawn from the flywheel rotor 130. The motor/alternator 140 is physically coupled to the flywheel rotor 130 either directly or indirectly using a shaft. The motor/alternator 140 is coupled to the remainder of the system 100 via wires or other electrical couplings. Generally, although only one of each component is shown, in practice a flywheel energy storage system 100 may include multiples of each individual component. FIG. 1 is one exemplary type of ac-to-ac conversion system. In general, the inventions described herein pertain to a broad range of ac-to-ac conversion topologies, as well as systems that interface directly to a direct current (dc) line. The latter are of especial relevance for dc microgrid and solar photovoltaic applications.

II. Flywheel Rotor Shape

Figure 2:
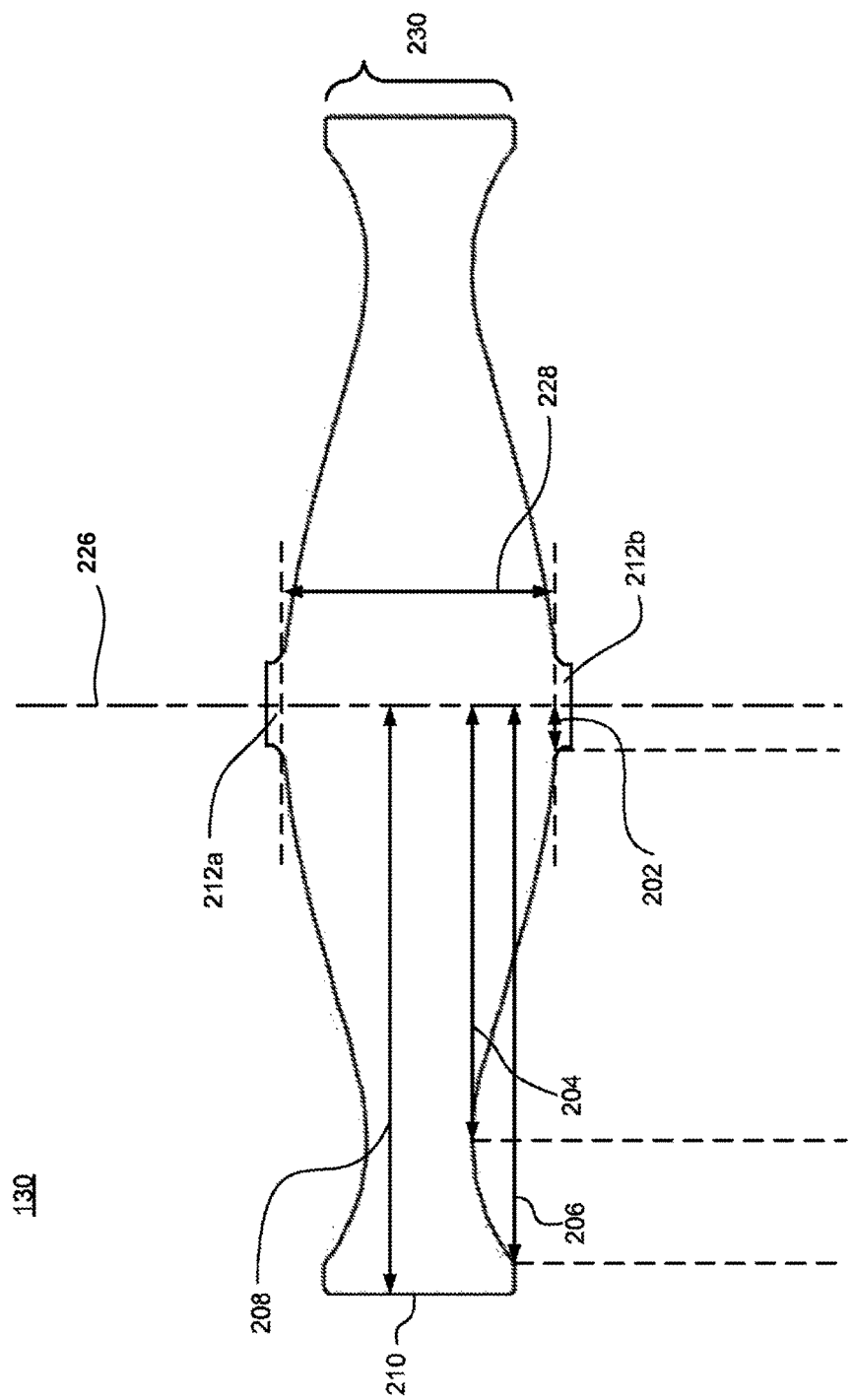
FIG. 2 is a cross sectional view of a flywheel rotor according to one embodiment.

FIG. 2 is a cross sectional view of a flywheel rotor 130 (or simply rotor) according to one embodiment. The rotor 130 is formed of a single mass of material. However, two different portions of the rotor 130 generally can be said to perform different functions. A primary rotational mass 230 makes up most of the mass of the rotor and stores the majority of the kinetic energy stored by the rotor. Two journals 212a and 212b extend perpendicularly from either side of the primary rotational mass and assist in coupling the rotor to separate shafts (not shown). Each of these portions is further described below. In some instances, the rotor may also include elements on its outer surface, for example discrete masses to provide centrifugal loading.

The rotor is generally rotationally symmetric, and thus the rotor can be described using a cylindrical coordinate system where the origin is through the center rotational axis 226 of the rotor. In implementations including other elements on the outer surface, such as discrete masses, the rotor and the discrete mass elements are both uniformly distributed about the origin. While the rotational axis 226 of the rotor is illustrated as being vertical the invention is not so constrained and a horizontal or other rotational axis may be used.

To provide an example of scale, in certain embodiments, the rotor 130 is between 36-192 inches in diameter, and weighs between 2-45 tons.

II.A Primary Rotational Mass

Beyond being rotationally symmetric, the primary rotational mass may be formed in a variety of different shapes, each designed to achieve specific performance goals. In one implementation, the primary rotational mass 230 of the rotor has a "fishtail" shape, when viewed in cross-section.

The fishtail shape helps ensure a nearly uniform distribution of stress throughout the primary rotational mass 230 due to rotational forces exerted on the rotor. The fishtail shape is an exemplary shape for optimizing rotor mass and material volume utilization, i.e. for optimizing the shape factor. Generally, the fishtail shape includes a center section and an adjoining peripheral mass. In the center section, the rotor is thicker closer to a first radius 202 near the center axis 226, and continuously decreases in thickness out to a second radius 204, away from the origin. In one embodiment, this central section is governed by a profile of the form:

$$t = he^{-\beta r^2} \tag{1}$$

where t is the longitudinal thickness of the rotor, h is the central thickness, r is the distance away from the origin along the polar axis, and β is a constant.

Regarding the peripheral mass's shape, between the second radius 204 and a third radius 206 near the outer diameter 210 of the rotor, the primary rotational mass 230 continuously increases in thickness in the longitudinal axis. Between the third radius 206 and a fourth radius 208, the rotor maintains a consistent thickness in the longitudinal axis for a short distance along the polar axis. The fourth radius 208 is located at or near the outer surface 210 (e.g., outer diameter) of the rotor along the polar axis. Near the fourth radius 208, the rotor's edges may be rounded or squared.

Regarding the relative proportions of the center section relative to the peripheral mass, the majority of the mass of the fishtail portion is located in the center section.

In the example illustrated in FIG. 2, the outer surface 210 of the rotor 130 has a diameter that is greater than the widest thickness 228 of the fishtail portion of the rotor 130. As will be further described below, any shape of rotor that allows the entirety of the rotor to be through-hardened is capable of achieving relatively high levels of working stress. Generally, rotors with diameters greater than their thickness rotate at slower speeds than their counterparts with thicknesses greater than their diameter. Slower rotational speeds reduce the operational requirements of the bearing assembly that allows the rotor to rotate, thereby reducing the overall cost of the flywheel system.

In another embodiment, rather than having the fishtail shape, the rotor instead has a cylindrical shape.

II.B Journals

Along the longitudinal axis (or center rotational axis) of the rotor, the rotor includes two journals 212, i.e. 212a and 212b, for attaching and detaching a shaft for transferring energy between the rotor and the bidirectional motor/alternator 140. The journals 212 remove the need for a bore to couple the rotor to the shaft. A bore results in a doubling of hoop stress at the inner diameter of the bore. Such bores are often drilled into rotors after manufacturing of the rotor, or the rotors are deliberately designed and manufactured with such a hole in mind. In contrast, replacing a bore with the journals 212 allows stress to be more evenly distributed throughout the primary rotational mass, thereby avoiding a stress riser where the bore would otherwise be placed.

Figure 3:
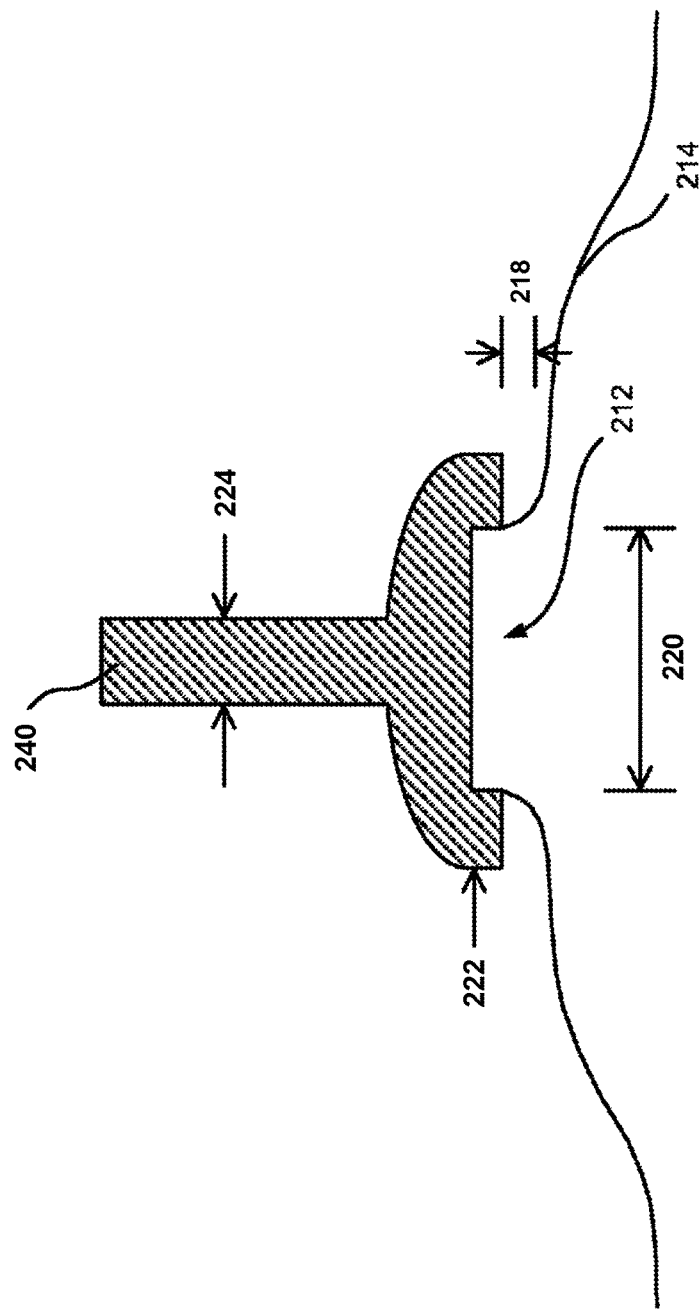
FIG. 3 is a cross sectional view of a journal of a flywheel rotor according to one embodiment.

FIG. 3 is a cross sectional view of a journal 212 of the rotor according to one embodiment. Each journal 212 extends outward 218 from a mound 214 of increased thickness that itself extends outward from the origin of the center section of the primary rotational mass 230. The mound 214 has a tapered shape that has a thickness greatest adjacent to the journal 212, and which tapers gradually in thickness as radius increases. The gradually tapering shape of the mound 214 isolates the journal from experiencing a stress riser or peak stress at the point where the journal 212 adjoins the primary rotational mass 230.

A fillet is present where the journal 212 and mound 214 are joined. The fillet avoids stress risers around the journal 212. The journal's outer surface is substantially planar along the polar axis. The outer surface of journal 212 is narrower 220 than a connecting end 222 of a shaft 240 configured to attach to the journal 212. The shaft 240 then narrows 224 considerably for the majority of its length. Generally, the diameter 220 of the interference fit between the upper surface of the journal 212 and the shaft 240 is greater than the diameter 224 of the shaft. Having a comparatively large diameter 220 for an interference fit is beneficial for further reducing stress risers inside the rotor 130 near the journal 212, since only a relatively light interference fit is needed with such a large diameter. Further, the interference stresses induced in the journal region are generally compressive, and thus work to mitigate centrifugally induced stresses in the journal 212. Thus, the combination of the tapering shape and wide diameter 220 of the journal 212 result in a mechanism for coupling with the shaft that minimizes the stress impact of the coupling on the rotor 130 as a whole.

In one embodiment, the shaft 240 is coupled to the journal 212 via a shrink fit. For example, the shaft 240 can be heated prior to attachment to the journal 212, causing the shaft 240 to thermally expand. After heating, the journal 212 and shaft 240 can be attached. The shaft 240 is then allowed to cool, thereby thermally contracting to create an interference fit with the journal 212. In another embodiment, an internal press fit may be used, with cooling of the shaft used to create the interference fit between the journal 212 and the shaft 240. The shaft 240 may also be coupled to the journal 212 via a press fit, or with a central axially oriented retaining bolt if a hollow cylindrical shaft is used. These are examples of numerous alternatives for coupling the shaft 240 to the journal 212.

As an example, in one embodiment the journal 212 has a diameter 220 of approximately 4-6 inches, and protrudes outward from the mound approximately one inch. The shaft has a connecting end 222 with an outer diameter of 6-8 inches. Away from the connecting end, the shaft 240 has an outer diameter of 1-3 inches, which is narrower than the 4-6 inch outer diameter 220 of the journal 212. In other embodiments, the diameter 220 of journal 212 may be in the 2-12 inch range.

In certain embodiments, the journal 212 is tapered slightly outward such that the circumference of more distant axial portions, i.e. the portions of the journal further away from the center of the rotor, have a greater circumference than portions that are closer to the center of the rotor. The advantage of tapering is to further secure the fit between shaft 240 and journal 212 after the two parts are coupled.

The rotor, including the primary rotational mass 230 and journals 212, is manufactured as a single piece of material, for example using the example materials and example process described below. Thus, the rotor has a single body construction where there are no welds, joints, seams, holes, or differences in construction between the primary rotational mass and journals 212. However, also as further described below, different portions of the single body/single piece rotor may be subjected to different treatments and/or manufacturing processes to vary the properties of the rotor at different points. For example, the surface of the rotor may receive different treatments than the interior of the rotor.

III. Rotor Material Properties and Manufacturing

The performance of the rotor is based on the materials that make up the rotor, as well as the manufacturing processes performed to convert the raw materials into the final state as they appear in the rotor. Important parameters that characterize rotor materials include the yield strength of the rotor, the fracture toughness of the rotor, the maximal intrinsic defect size (or maximum initial crack size) in the rotor, and the cyclic fatigue (or cyclic crack growth rate). The rotor may also be described in terms of other properties that are either known equivalents of these properties or that can be converted into/derived from these properties.

In one embodiment, the rotor has parameter values such that the yield strength $\sigma_{yield}$ of the rotor is greater than a first threshold, the fracture toughness σfracture of the rotor is greater than a second threshold, and the maximal intrinsic defect size is less than a threshold size. Defined in this way the rotor achieves significant performance in the working stress, $\sigma_{working}$, it can endure over its operational lifetime. During operation, the rotor will always meet the following condition:

$$\sigma_{working} < \alpha \sigma_{yield} \qquad (2)$$

where α is a parameter for derating between 0 and 1. Further, the rotor material is designed such that during the operational lifetime of the rotor the cyclic crack growth, or growth of an initial crack present in the rotor during manufacturing, grows slowly enough to permit tens of thousands of complete stress cycles.

As a specific example, in one embodiment the rotor has a yield strength $\sigma_{yield}$ of at least 800 MPa, a fracture toughness σfracture of at least 40 megapascal per square root meter (MPa·m0.5), and a maximal intrinsic defect size that is 2 millimeters (mm) or smaller. In another embodiment, the rotor has a yield strength $\sigma_{yield}$ between 800 MPa and 2 GPa, inclusive, a fracture toughness $\sigma_{fracture}$ between 40 and 200 MPa·m0.5, inclusive, and a maximal intrinsic defect size between 0.05 mm and 2 mm, inclusive. In other embodiments, the rotor may have properties within any sub-range within the above described ranges. For example, in one embodiment, the rotor has a yield strength a σyield of between 800-1000 MPa, 1000-1100 MPa, 1100-1200 MPa, 1200-1300 MPa, 1300-1400 MPa, 1400-1500 MPa, 1500-1600 MPa, 1600-1700 MPa, 1700-1800 MPa, 1800-1900 MPa, 1900-2000 MPa, or any combination of sub-ranges thereof. In the same or a different embodiment, the rotor has a fracture toughness, $\sigma_{fracture}$, of between 40-50 MPa·m0.5, 50-60 MPa·m0.5, 60-70 MPa·m0.5, 70-80 MPa·m0.5, 80-90 MPa·m0.5, 90-100 MPa·m0.5, 100-110 MPa·m0.5, 110-120 MPa·m0.5, 120-130 MPa·m0.5, 130-140 MPa·m0.5, 140-150 MPa·m0.5, 150-160 MPa·m0.5, 160-170 MPa·m0.5, 170-180 MPa·m0.5, 180-190 MPa·m0.5, 190-200 MPa·m0.5, or any combination of sub-ranges thereof. In the same or a different embodiment, the rotor has a maximal intrinsic defect size of between 0.5-0.6 mm, 0.6-0.7 mm, 0.7-0.8 mm, 0.8-0.9 mm, 0.9-1.0 mm, 1.0-1.1 mm. 1.1-1.2 mm, 1.2-1.3 mm, 1.3-1.4 mm, 1.4-1.5 mm, 1.5-1.6 mm, 1.6-1.7 mm, 1.7-1.8 mm, 1.8-1.9 mm, 1.9-2.0 mm, or any combination of sub-ranges thereof.

A rotor that meets the above exemplary thresholds can be made of 300M steel. 300M steel is described by Aerospace Material Standard (AMS) Society of Automotive Engineers (SAE) 6257 (referred to simply as SAE-6257). 300M steel has a proportional chemical composition of 1.6% Silicon (Si), 0.82% Chromium (Cr), 1.8% Nickel (Ni), 0.40% Molybdenum (Mo), 0.08% Vanadium (V), and a range of 0.40-0.44% Carbon (C), with remainder being Iron (Fe). 300M steel has a relatively low cost, and thus is advantageous for reducing the cost of a flywheel energy storage system including a rotor made of this material. The V and Si are alloying elements that offer improved hardenability and allow thick-section rotors to be made that are up to 14" thick and entirely through-hardened, for example in the fishtail shape as described above.

However, mere specification of 300M steel alone is insufficient to ensure the parameters specified above. Additional manufacturing steps are used to improve the performance of the rotor. These steps include refining, multi-step forging, heat treatments, surface treatments, and machining.

The 300M steel is refined using a refinement process such as vacuum-arc-remelting ("VAR"), electro-slag-remelting ("ESR"), or vacuum induction melting (VIM). These processes help remove defects larger than the desired maximal intrinsic defect size. In contrast, if the 300M steel were instead melted in open air, it would tend to have defects larger than this desired maximal intrinsic defect size such as inclusions or other impurities. VAR refinement helps ensure that the maximal intrinsic defect size is 2 mm or smaller.

Multi-step forging introduces directional grains into the rotor. Generally, grain orientation is determined based on the forging process used. A single step forging process may be insufficient to ensure the presence of consistent directional grains throughout the entirety of the rotor. Performing multiple forging steps helps ensures consistent grain orientation throughout the entirety of the rotor. Controlling grain orientation also has the added benefit of shaping and orienting any inclusions present in the rotor.

Generally, heat treatments are used to increase yield strength and hardness of steel. In a heat treatment, the steel is heated (or austenetized) into the austenite phase. The time and temperature of the heating in part defines the grain size of the rotor. The austenized part is then rapidly cooled (or quenched). The quenching converts the austenite into one of several other material phases of steel, such as pearlite, bainite, and martensite. Due to the physics of heat transfer, not all depths within the steel will cool at the same rate, meaning that shallower depths of the steel will often quench into a significant proportion of martensite (e.g., greater than 50% martensite), whereas deeper depths of the steel may quench into a significant proportion of pearlite or other material phases, with only a minority of the steel quenching into martensite (e.g., less than 50% martensite). The proportions of various material phases a steel quenches into is governed by the material's transition curve (referred to as a TTT curve). Martensite, specifically, is desirable for use in a rotor because it has very high yield strength and also very high hardness. A piece of steel is said to be through-hardened when at every thickness the steel contains at least 50% martensite.

In one embodiment, VAR 300M steel is used in the rotor because it is possible to through-harden the 300M steel to depths of 8-14 inches, making it very useful for forming a rotor of sufficient size to store a significant amount of kinetic energy. Particularly, the Si and V alloying elements in 300M delay the formation of pearlite during quenching in favor of the transition to martensite, resulting in increased through-hardness at significant depths within the steel. In a VAR 300M rotor, through-hardening allows the rotor to achieve a yield strength σyield of up to 2 GPa.

Quenched steels have a drawback of having a low fracture toughness. Consequently, the quenching step can be followed by a tempering step. Tempering maintains the steel at a temperature lower than the austenetizing temperature (e.g., 600-1200 Fahrenheit (F)) for a period of time (e.g., several hours) before cooling slowly back to room temperature. At the expense of some yield strength, $\sigma_{yield}$, tempering significantly improves fracture toughness, and eliminates residual internal stresses. In a VAR 300M rotor, tempering allows the rotor to achieve a fracture toughness σfracture of at least 70 MPa·m0.5 while also maintaining a σyield of over 900 MPa.

Surface treatments protect the surface of the rotor. Several different surface treatments may be used. A first is shot peening, where compressive stress is imparted to the surface of the rotor to harden it. A second is nitrogen and/or carbon treatments that similarly increase hardness as well as the yield strength of the rotor's surface. Other surface treatments may also be used.

Although 300M alloy steel is one exemplary choice for a flywheel rotor, as detailed above, there are other alloys with similar properties in the 4000 series of alloys, e.g. 4340. Some of these alloys share the main advantages of 300M, and also serve well in the flywheel rotor application.

One advantage of a rotor constructed as described above is that a significantly larger rotor, one capable of storing tens to hundreds of kWh of energy, can be manufactured at low cost relative to other potentially conceivable processes.

IV. Method of Manufacture

Figure 4:
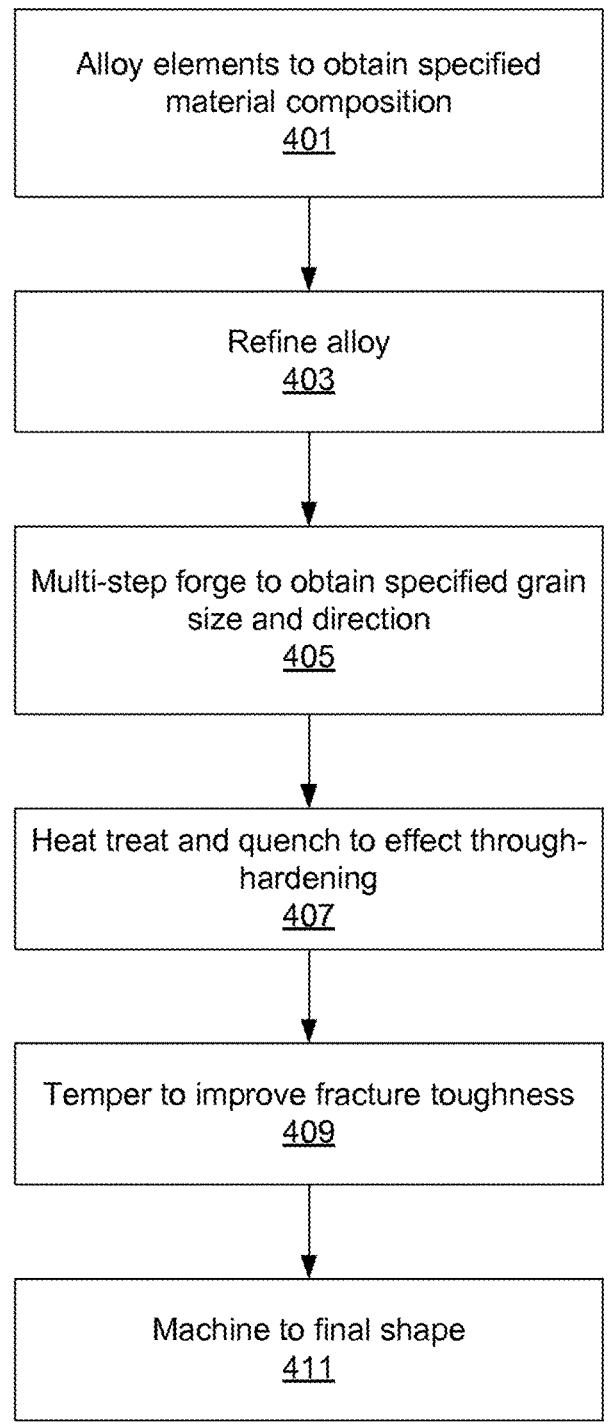
FIG. 4 is an exemplary process for manufacturing the flywheel rotor according to one embodiment.

FIG. 4 is an exemplary process for manufacturing a rotor according to one embodiment. In the example of FIG. 4, elements are alloyed 401 to manufacture steel with a specified material composition. For example, if 300M is to be used, Si, Cr, Ni, Mo, V, C, and Fe are alloyed together. The alloyed elements are then refined 403 to remove large defects. Continuing with the example above, the VAR process may be used to refine the 300M alloy. The refined alloy is then forged 405 to near net shape using a multi-step process to orient grain size and direction. A heat treatment and quench is applied 407 to through-harden the forged rotor material to improve yield strength. Tempering 409 is then performed to improve fracture toughness. The rotor material may then be machined 411 to form the rotor into the desired, final, shape.

V. Stacked Rotor Embodiments

As discussed hereinabove, rotor thickness using low-alloy steel materials such as 300M steel, is generally limited to 8-14 inches due to the constraint of through-hardening during the quench step. If using an alloy such as AISI 4340, thickness is further limited to about 4-6 inches. As previously discussed, one way to reduce the manufacturing cost of a flywheel unit is to increase the mass of the rotor. One way to accomplish this is to stack and interconnect multiple sub-rotors to form a rotor within a single flywheel unit.

Figure 5:
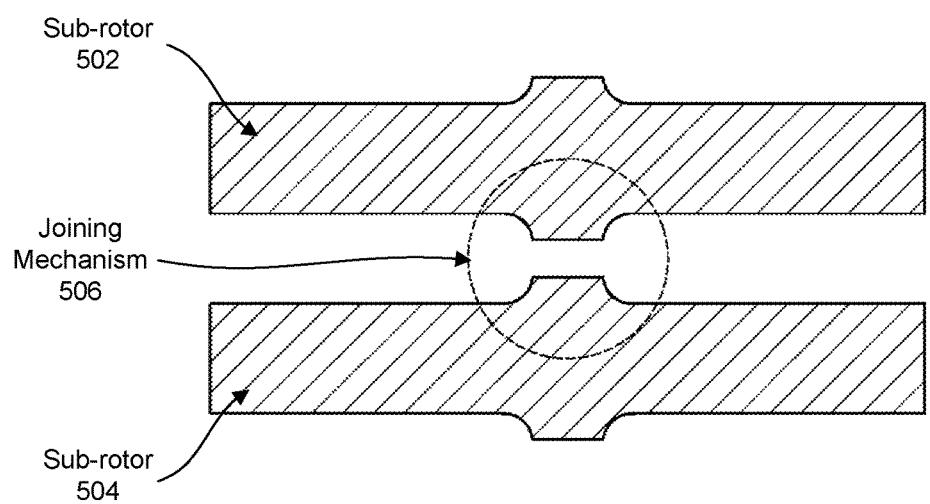
FIG. 5 is a cross sectional view of a stack of two sub-rotors of a flywheel unit that are interconnected by a joining mechanism.

FIG. 5 depicts a cross section of a flywheel unit where the rotor includes a stack of two sub-rotors that are interconnected by a joining mechanism 506. The axial centers of each sub-rotor in the stack are aligned vertically. Joining mechanism 506 fixedly connects the lower journal of top sub-rotor 502 with the top journal of lower sub-rotor 504 such that the two sub-rotors, 502-504 rotate in synchrony, i.e. at the same speed, in the same direction, and at the same time. Two embodiments of joining mechanism 506 are described in FIGS. 6-7 with the understanding that other embodiments of joining mechanism 506 are possible and are within the scope and spirit of the subject invention.

In one embodiment, described hereinbelow with reference to FIG. 6, joining mechanism 506 surrounds each pair of adjacent journals in the stack and the journals are typically in direct contact. In another embodiment, described hereinbelow with reference to FIG. 7, joining mechanism 506 utilizes joining plates such that each pair of journals are indirectly in contact, i.e. each journal attaches to a joining plate and the joining plates are fastened together. Thus, when using joining mechanism 506, each pair of adjacent sub-rotor journals are either in direct or indirect contact and are positioned one above the other. Thus, while FIG. 5 shows a space between the lower journal of sub-rotor 502 and the upper journal of sub-rotor 504 such a space will not exist in embodiments where the two journals are in direct contact and will be filled in embodiments where there is a plate or other connecting material between the two journals. In other embodiments of joining mechanism 506, there may be a minimal space between adjacent journals, for example to avoid friction between the adjacent journals. Generally, joining mechanism 506 forms a joint between two adjacent journals.

The stacking concept, illustrated in FIG. 5 and discussed hereinbelow, can be generalized to comprise a stack with any integral number of disk sub-rotors. In certain embodiments, each individual disk sub-rotor is manufactured as described above with reference to FIG. 4. However, the sub-rotor stacking design does not depend on a specific rotor manufacturing method and will work with rotors manufactured using other methods as well.

Further, while the axial centers of the sub-rotors are illustrated and heretofore described as sharing a vertical axis, the invention is not so constrained. The principal requirement is that the centers of the sub-rotors are co-axial, i.e. share a common axis of rotation. Thus, for example, the centers of the sub-rotors may be aligned along a common horizontal axis. In this case, joining mechanism 506 interconnects two adjacent journals where one is positioned to the right or left, rather than above or below the next. Generally, the common axis of rotation may be oriented at any angle in three dimensional space.

Figure 6:
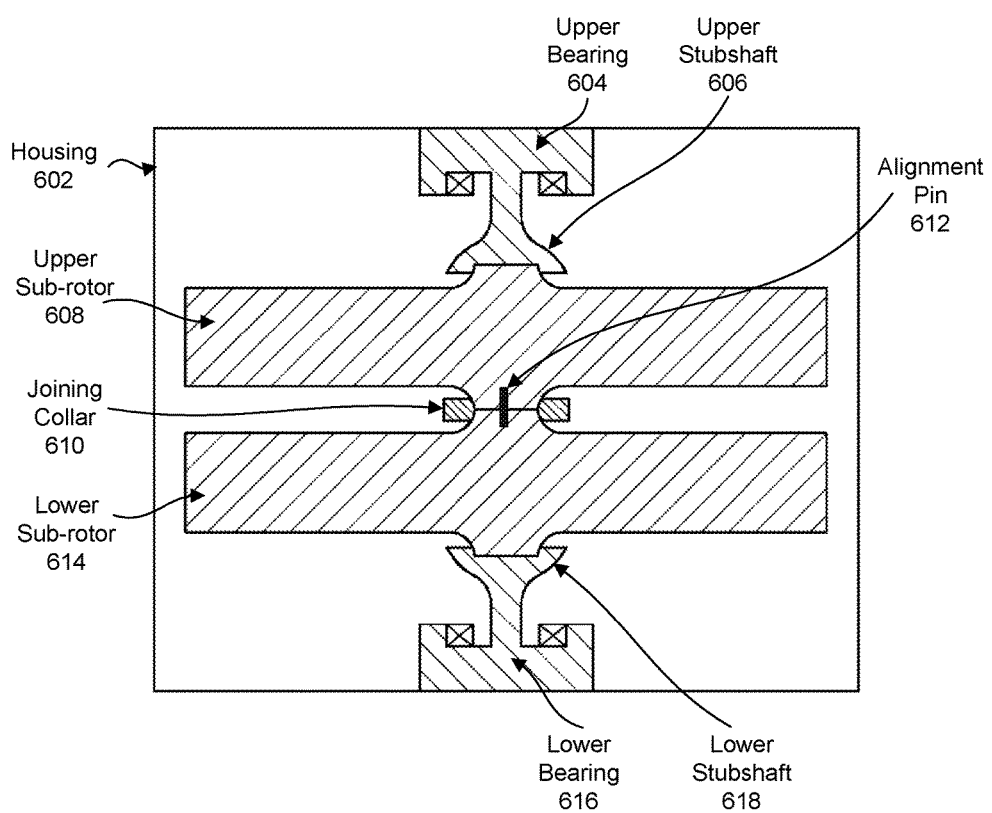
FIG. 6 is a cross sectional view of an exemplary rotor built with a stack of two sub-rotors connected by a joining collar.

FIG. 6 illustrates a cross section of an exemplary rotor built with a stack of two monolithic disk sub-rotors connected by a joining collar 610. In this embodiment, joining collar 610 is an embodiment of joining mechanism 506. In certain embodiments, joining collar 610 is a cylindrical tube, or hollow cylinder, that fits around the lower journal of an upper sub-rotor 608 and the upper journal of a lower sub-rotor 614. Typically, joining collar 610 is made of steel but it can be made of other materials as well.

It is strategic to implement the joints with adequate stiffness so as to cause all resulting rotor internal vibratory modes to be at sufficiently high frequency so as not to overlap with the working speed range. Vibratory modes in the speed range can lead to undesired large amplitude forced resonant responses if the rotor suffers from residual unbalance. The schemes outlined herein enable adequately stiff rotor joining, to avoid placing modes in the working mechanical frequency (or speed) range.

In one embodiment, to assemble the stack of two sub-rotors, joining collar 610 is heated and placed over lower sub-rotor 614. Next upper sub-rotor 608 fits on top of joining collar 610 and its lower journal fits inside joining collar 610. When joining collar 610 cools a shrink fit is achieved. In other embodiments, joining collar 610 may be bolted, or otherwise attached into place with respect to the upper and lower journals.

In certain embodiments, an alignment pin 612 is inserted into a pre-drilled hole through the axial center of the lower journal of upper sub-rotor 608 and the upper journal of lower sub-rotor 614. Alignment pin 612 maintains concentricity between the two sub-rotors during assembly and operation; i.e. it prevents radial displacement or slippage between the two sub-rotors during operation.

As further illustrated in FIG. 6, upper sub-rotor 608 attaches to an upper stubshaft 606 which in turn connects to an upper bearing 604. Similarly, lower sub-rotor 614 attaches to a lower stubshaft 618 which in turn connects to a lower bearing 616. The ensemble of elements are housed within a housing 602.

Figure 7:
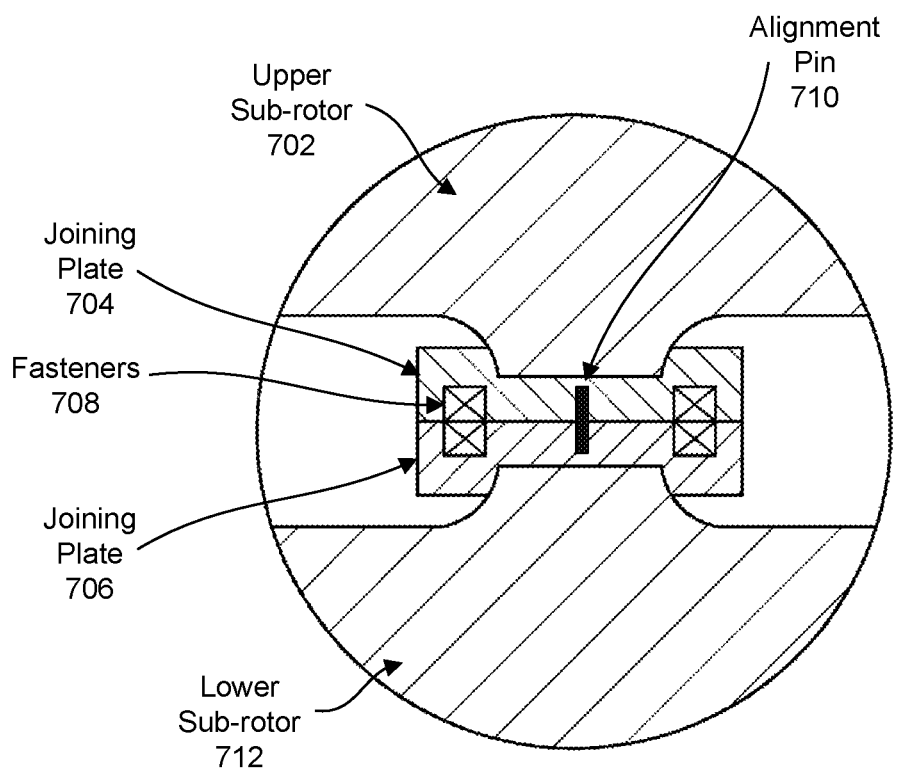
FIG. 7 is a cross sectional view of a second embodiment of a joining mechanism that uses joining plates to connect two sub-rotors so that they effectively operate as a single monolithic rotor.

FIG. 7 is a cross sectional view of a second embodiment of joining mechanism 506 that joins two sub-rotors so that they effectively operate as a single monolithic rotor. In this embodiment, the joining is accomplished by shrink fitting a first joining plate 704 to the lower journal of upper sub-rotor 702 and a second joining plate 706 to the upper journal of lower sub-rotor 712. Each of joining plates 704, 706 has a portion that mates with a respective journal. The two mating plates 704, 706 are then joined with fasteners 708. In certain embodiments, fasteners 708 is a bolt pattern, i.e. a circular or other specified arrangement of bolts. To accept the shrink fit, the journal may have a diameter dimensioned in the range of 2-12 inches depending upon the disk sub-rotor dimension, and mechanical requirements. The large parallel area of the mating plate interface ensures retention of parallelism while providing excellent rigidity in the interface. Typically, joining plates 704 and 706 are identical as are upper sub-rotor 702 and lower sub-rotor 712 although other configurations are possible.

Joining plates 704, 706 are typically made of steel and have pre-drilled holes to accept bolts or other fastening devices. Joining plates 704, 706 are typically symmetric with respect to the rotational axis of the journals and sub-rotors. A most preferred thickness of joining plates 704, 706 is in the range of 0.5 to 2 inches; while in certain embodiments a range of 0.25 inches to 3 inches per plate is acceptable.

Similar to the joining mechanism embodiment illustrated in FIG. 6, an alignment pin 710 may be inserted into a pre-drilled hole through the axial center of the lower journal of upper sub-rotor 702 and the upper journal of lower sub-rotor 712. Alignment pin 710 maintains alignment, i.e. concentricity, between the two sub-rotors thereby preventing radial displacement or slippage between the two sub-rotors during operation. It further serves to prevent or reduce vibrations.

FIGS. 6 and 7 illustrate two techniques for mechanically joining two sub-rotors to form a single monolithic rotor. Other joining techniques may be used and are within the scope and spirit of the subject invention.

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A flywheel rotor comprising:
a first sub-rotor and a second sub-rotor, each of the first and second sub-rotors being respectively rotationally symmetric around a respective center axis and disk shaped, the respective center axes being coaxial, wherein each of the first and second sub-rotors has a respective first journal and a respective second journal extending outward along the respective center axis;
a first joining plate and a second joining plate contacting each other, wherein the first joining plate contacts the respective first journal of the first sub-rotor and the second joining plate contacts the respective first journal of the second sub-rotor;
one or more fasteners connecting the first joining plate to the second joining plate, wherein the one or more fasteners create a rigid connection between the first and second joining plates; and
an alignment pin contacting a pre-drilled hole in the first joining plate and contacting a pre-drilled hole in the second joining plate.

2. The flywheel rotor of claim 1 wherein each of the first and second sub-rotors is made of a respective single piece of steel.

3. The flywheel rotor of claim 1 wherein each of the first and second sub-rotors is substantially a same size and shape.

4. The flywheel rotor of claim 3 wherein a respective thickness of each of the first and second sub-rotors is substantially between 8 and 14 inches.

5. The flywheel rotor of claim 3 wherein a respective diameter of each of the first and second journals at a respective furthest distance from the respective center axes is substantially between 4 and 6 inches.

6. The flywheel rotor of claim 1 wherein each of the first and second joining plates is respectively symmetric with respect to the respective center axes.

7. The flywheel rotor of claim 1 wherein a respective thickness of each of the first and second joining plates is in a respective range of .25 to 3 inches.

8. The flywheel rotor of claim 1 wherein each of the first and second joining plates is respectively made of steel.

9. The flywheel rotor of claim 1 wherein the one or more fasteners include a circular bolt pattern.

10. The flywheel rotor of claim 1 wherein the one or more fasteners are configured to impart compressive loading between the first and second joining plates sufficient to keep the first and second joining plates in positive contact under all operational loading conditions.

* * * * *